(12) United States Patent
Lipson et al.

(10) Patent No.: US 7,180,573 B2
(45) Date of Patent: Feb. 20, 2007

(54) SYSTEM AND METHOD TO BLOCK UNWANTED LIGHT REFLECTING FROM A PATTERN GENERATING PORTION FROM REACHING AN OBJECT

(75) Inventors: Matthew Lipson, Stamford, CT (US); Christopher J. Mason, Newton, CT (US); Justin L. Kreuzer, Trumbull, CT (US)

(73) Assignee: ASML Holding N.V., Veldhoven (NL)

( * ) Notice: Subject to any disclaimer, the term of this patent is extended or adjusted under 35 U.S.C. 154(b) by 145 days.

(21) Appl. No.: 10/965,025

(22) Filed: Oct. 15, 2004

(65) Prior Publication Data

US 2006/0082745 A1  Apr. 20, 2006

(51) Int. Cl.
*G03B 27/42* (2006.01)
*G03B 27/54* (2006.01)
(52) U.S. Cl. .......................... 355/53; 355/67
(58) Field of Classification Search ................ 355/52, 355/53, 67–71; 430/5, 20, 30
See application file for complete search history.

(56) References Cited

U.S. PATENT DOCUMENTS

| | | | |
|---|---|---|---|
| 5,754,217 A * | 5/1998 | Allen | 347/239 |
| 6,028,690 A | 2/2000 | Carter et al. | |
| 6,038,056 A | 3/2000 | Florence et al. | |
| 6,282,010 B1 | 8/2001 | Sulzbach et al. | |
| 6,515,257 B1 * | 2/2003 | Jain et al. | 219/121.73 |
| 6,637,894 B2 | 10/2003 | Dewald et al. | |
| 6,794,100 B2 * | 9/2004 | Boettiger et al. | 430/30 |
| 6,870,554 B2 * | 3/2005 | Jain | 345/697 |
| 2004/0075882 A1 * | 4/2004 | Meisburger | 359/290 |

* cited by examiner

*Primary Examiner*—Henry Hung Nguyen
(74) *Attorney, Agent, or Firm*—Sterne, Kessler, Goldstein & Fox P.L.L.C.

(57) ABSTRACT

A system and method include a pattern generating portion that is used to pattern an object via a projection system. The pattern generating portion includes active and inactive areas. The pattern generating portion patterns light traveling towards the active areas and the projection system projects the patterned light onto the object. The pattern generating portion directs light traveling towards inactive areas away from the object.

27 Claims, 5 Drawing Sheets

SYSTEM AND METHOD TO BLOCK UNWANTED LIGHT REFLECTING FROM A PATTERN GENERATING PORTION FROM REACHING AN OBJECT

BACKGROUND OF THE INVENTION

1. Field of the Invention

The present invention is related to spatial light modulators.

2. Background Art

Pattern generating portions are used in many types of systems to pattern a light beam, which is then projected onto a photosensitive surface of an object (e.g., a substrate, a display device, a biological substance, or the like). Pattern generating portions can include, but are not limited to, reticles, masks, spatial light modulators (SLMs), contrast devices, digital mirror devices (DMDs), liquid crystal displays (LCDs), grating light valves (GLVs), liquid crystal on silicon (LCOS) devices, or the like. Patterning a light beam can be done to pattern the photosensitive surface or display a pattern on the photosensitive surface. Example systems include, but are not limited to, projectors, lithography systems, biotechnology systems, projection television systems, and the like. However, light reflecting from undesirable areas of the pattern generating portions (e.g., inactive areas, such as circuits, actuators, etc.) can cause scattered or stray light to reach the object, which degrades contrast.

Therefore, what is needed is a system and method that can be used to substantially reduce or eliminate light from reaching an object that reflects from undesirable areas of a spatial light modulator.

BRIEF SUMMARY OF THE INVENTION

An embodiment of the present invention provides a system comprising a pattern generating portion, a projection system, and an object. The pattern generating portion includes active and inactive areas. The pattern generating portion patterns light traveling towards the active areas and the projection system projects the patterned light onto the object. The pattern generating portion directs light traveling towards inactive areas away from the object.

Another embodiment of the present invention provides a method of making a device comprising the following steps. Patterning portions of a beam of radiation that travels along a path including active areas of a pattern generating portion. Projecting the patterned beam onto an object. Directing portions of the beam of radiation that travels along a path towards inactive areas of the pattern generating portion away from the object.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate various embodiments of the present invention and, together with the description, further serve to explain the principles of the invention and to enable a person skilled in the pertinent art to make and use the invention.

Figure 1:
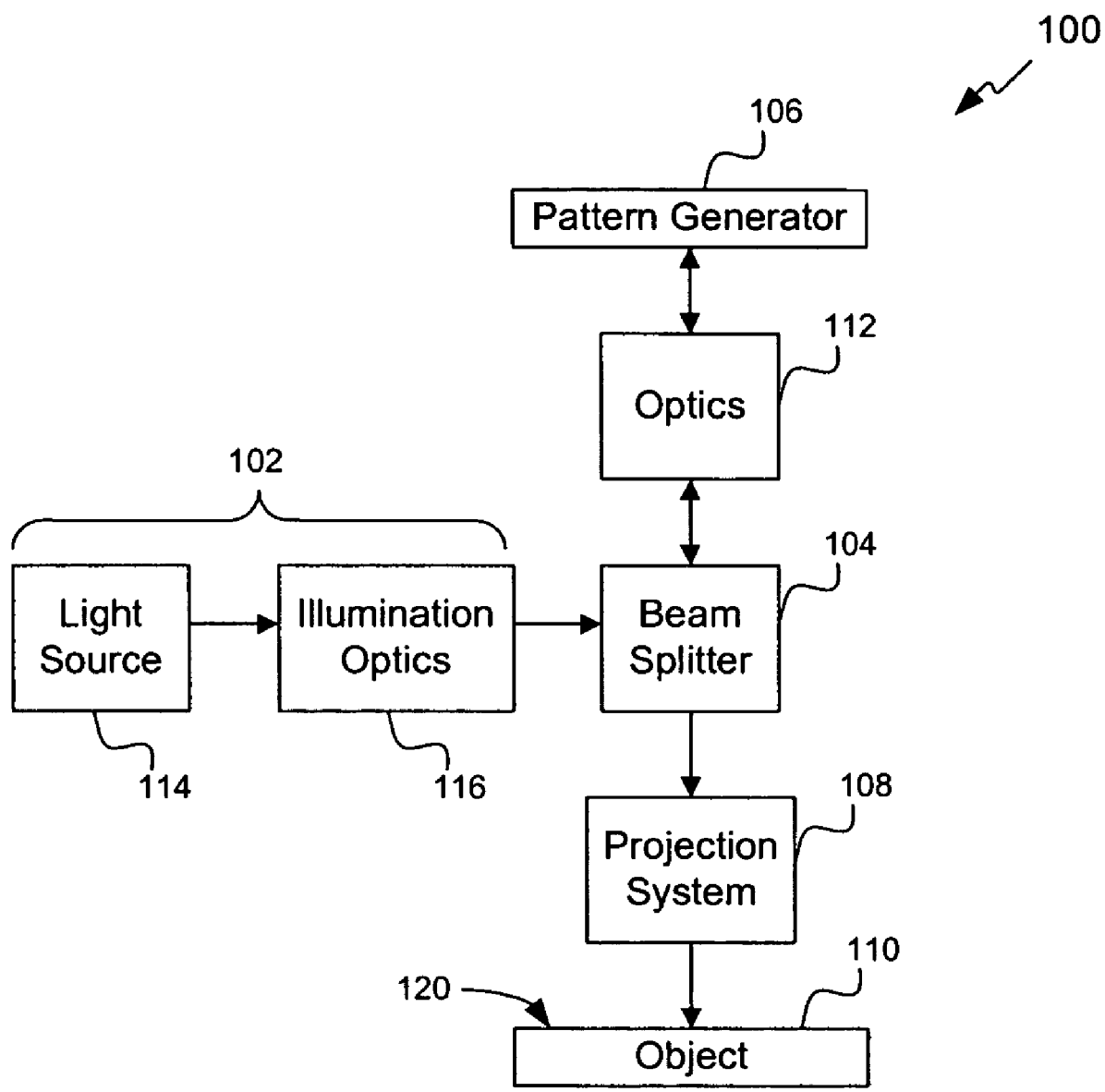
FIGS. 1 and 2 show systems including reflective spatial light modulators, according to embodiments of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

One or more embodiments of the present invention provide a system and method comprising a pattern generating portion and an object. The pattern generating portion includes active and inactive areas. The pattern generating portion patterns light traveling towards the active areas and the projection system projects the patterned light onto the object. The pattern generating portion directs light traveling towards inactive areas away from the object.

In various examples, the object can be a biological substance, a substrate, a display device, a print head, a nano or micro fluidic device, or the like.

Terminology

Throughout the description, the use of the term "pattern generating portion," unless otherwise described, includes at least a contrast devices, liquid crystal display, grating light valve, digital or analog mirror device, or any other device that can be used to impart a pattern onto a light beam, as will become apparent to one or ordinary skill in the art upon reading this description.

The use of "system," unless otherwise described, is meant to include photolithography, direct write lithography, maskless lithography, immersion lithography, projectors, biotechnology systems, projection televisions, and the like.

The use of "light" or "radiation" is meant to include any wavelength desired for a particular application.

The use of "substrate" is meant to include any planar or non-planar structure capable of having one or more light sensitive layers formed thereon in order to capture or display a pattern falling on the light sensitive layer. This can be, but is not limited to, biotechnical substance, substrate, a display device, a print head, a nano or micro fluidic device, a semiconductor wafer, a flat panel display glass substrate or panel, a image projection device in a projector, projection television, display, or the like.

Exemplary Environments

FIG. 1 shows a system 100, according to one embodiment of the present invention. System 100 comprises an illumination system 102, a beam splitter 104, a pattern generating portion 106, a projection system 108, and an object 110. In this embodiment, pattern generating portion 106 includes a reflective pattern generator or spatial light modulator, examples of which are described above. In one example, system 100 also comprises optics 112 between pattern generator 106 and beam splitter 104. In one example, illumination system 102 includes a light source 114 and illumination optics 116.

Pattern generating portion 106 is used in system 100 to pattern light, which forms patterned images on object 110. The projected image produces changes in the characteristics of a layer (not shown) (e.g., photosensitive material) formed on a surface 120 of object 110. These changes correspond to features in the image projected onto object 110.

Figure 2:
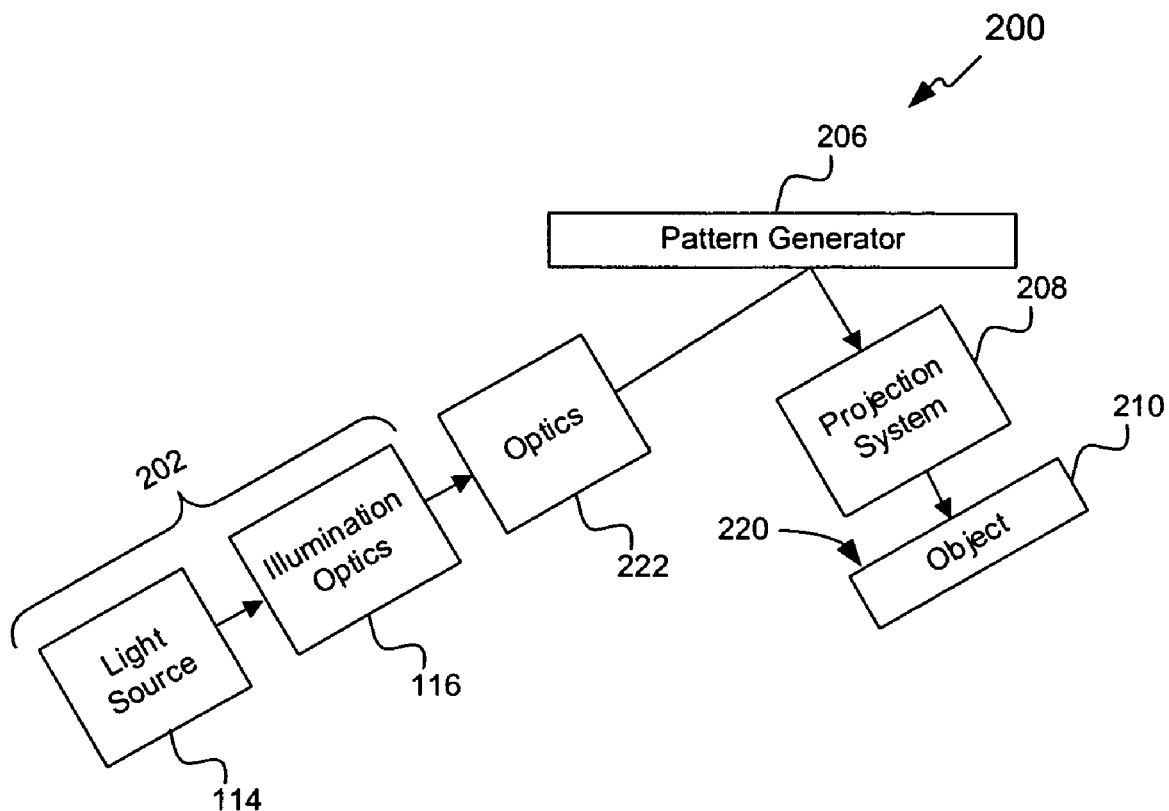

FIG. 2 shows a system 200, according to one embodiment of the present invention. System 200 includes a reflective pattern generating portion 206, similar to reflective pattern generating portion 106 described above. A main difference between system 200 and system 100 is that beam splitter 104 in system 100 has been removed. Thus, light is directed to pattern generating portion 206 from optics 222. Otherwise, system 200 operates similar to system 100, as described above.

Exemplary Reflective Pattern Generating Portions

Figure 3:
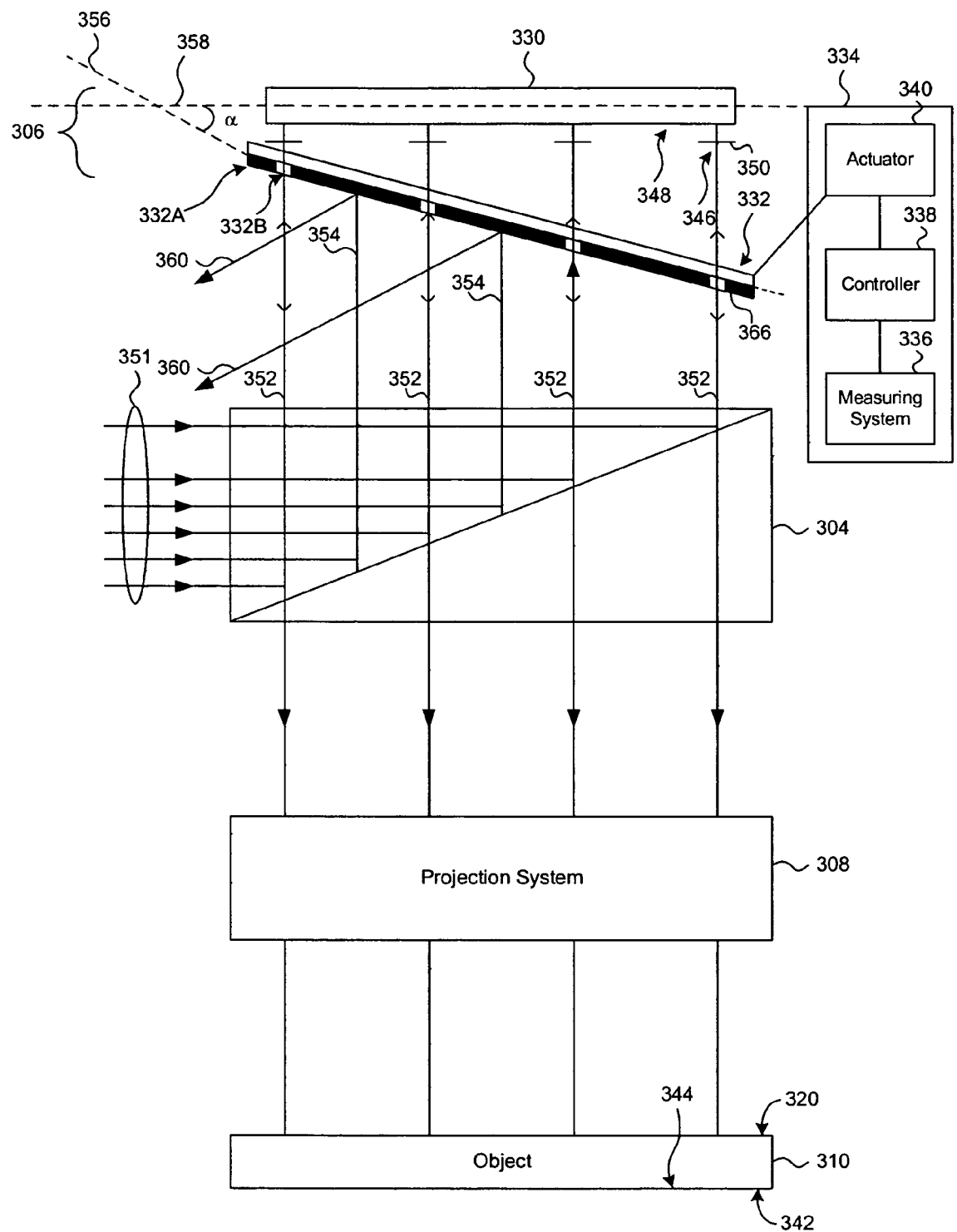
FIGS. 3 and 4 show pattern generating portions, according to embodiments of the present invention.

FIG. 3 shows a reflective pattern generating portion 306, according to one embodiment of the present invention. Pattern generating portion 306 comprises a pattern generator 330 and a masking device 332. A positioning and aligning system 334 is coupled to pattern generating portion 306. Positioning and aligning system 334 comprises a measuring system 336, a controller 338, and an actuator 340. As discussed above, light reflecting from pattern generating portion 306 is directed towards an object 310 using a projection system 308.

It is also to be appreciated, in display environments, a side 342 of object 310 and/or a surface 344 of side 342 include one or more layers of photosensitive material, and surface 320 is transparent to a wavelength of interest.

Pattern generator 330 includes an array of active areas 346 and inactive areas 348. For example, in the embodiment shown, active areas 346 are individually controllable reflective elements 350 and inactive areas 348 comprise circuits and actuators, for example, that are used to control and move the individually controllable reflective elements 350. Inactive areas 348 are thus located between adjacent elements 350. In one example, individually controllable reflective elements 350 are tilting, pistoning, or rotating mirrors.

A light beam 351 from a light source (not shown) reflects from pattern generating portion 306 in different ways depending on whether it is directed along a path toward mirrors 350 or inactive areas 348. This is shown as light paths 352 and 354.

In a conventional system, without masking device 332, light traveling along light path 354 to inactive areas 348 can become scattered light that can reach object 310. When this occurs, light from inactive areas 348 can cause errors in the pattern being formed on or displayed by object 310.

It is to be appreciated only portions of beam 351 reaching active areas 346 that are turned ON (i.e., when ON is the default position for patterning), based on pattern information received by pattern generator 330, will reach projection system 308 and object 310, as would be appreciated by one of ordinary skill in the art.

In order to substantially reduce or eliminate light from inactive areas 348 reaching object 310, according to this embodiment of the present invention, masking device 332 is used to block the light from reaching inactive areas 348. Masking device 332 comprises blocking areas 332A and non-blocking areas 332B. For example, masking device 332 can be a patterned glass or similar substrate have coated areas 332A and uncoated areas 332B of the pattern. Non-blocking areas 332B allow transmission of light at a desired wavelength through light path 352 through masking device 332. Blocking areas 332A do not allow transmission of light through masking device 332, for example, through use of a coating of chrome or similar opaque material that either absorbs light traveling along light path 354 or reflects light from light path 354 towards a light path 360 away from pattern generator 330 and object 310.

In this embodiment, in order to properly direct light traveling along light path 354 away from pattern generator 330 and object 310, masking device 332 is placed at an angle α with respect to pattern generator 330 and/or object 310. Angle α is an angle between a longitudinal axis 356 of masking device 332 and longitudinal axis 358 of pattern generator 330. In one example, angle α is determined using positioning and aligning system 334, as is described below. By angling masking device 332 with respect to pattern generator 330 and/or object 310, light cannot reach inactive areas 348, and instead is either absorbed or directed toward light path 360 from blocking areas 332A, which can be away from both light path 352 and object 310.

Positioning and aligning system 334 is used to determine angle α, such that light traveling along light path 354 does not reach inactive areas 348 and does not teach object 310. Measuring system 336 is used to determine, for example, a current location of light path 354 and/or a current position of masking device 332. Controller 338 receives information from the measuring system 336 and uses the information to determine an optimal light path for light path 360. Actuator 340 receives control signals from controller 338, and uses the control signals to move, adjust, and/or align masking device 332 until light reflecting from blocking area 332A on surface 362 of masking device 332 is directed along light paths 360.

In one embodiment, the angle α can be substantially 0. In this embodiment, a material used for blocking areas 332A, a finish of blocking areas 332A (e.g., a roughness), and/or a pattern used to form blocking areas 332A can be configured so as to limit reflection of light. In another example, the light is scattered or diffracted in a wide angle, which would prevent all or substantially all of the light, outside or a desired angle or range thereof, from being captured by a pupil of projection system 308.

Figure 4:
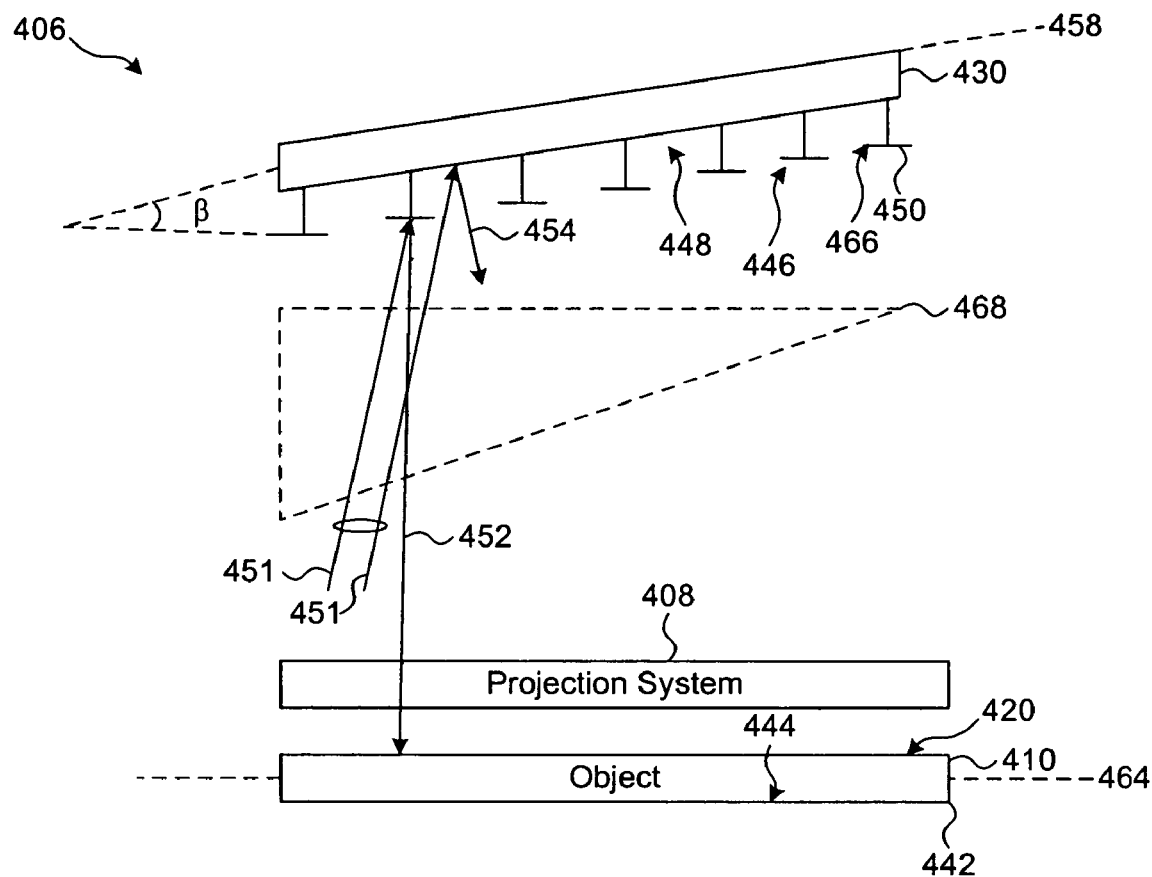

FIG. 4 shows a reflective pattern generating portion 406, according to one embodiment of the present invention. Pattern generating portion 406 comprises a pattern generator 430. Reflection and blocking is similar as discussed above in connection with FIG. 3. Light reflecting from pattern generating portion 406 is directed towards an object 410 using a projection system 408.

It is to be appreciated that light from pattern generating portion 406 may be directly received by a surface 420 of object 410.

It is also to be appreciated, in display environments, a side 442 of object 410 and/or a surface 444 of side 442 include one or more layers of photosensitive material, and surface 420 is transparent to a wavelength of interest.

Pattern generator 430 includes an array of active areas 446 and inactive areas 448. For example, in the embodiment shown active areas 446 are individually controllable reflective elements 450 and inactive areas 448 comprise circuits and actuators, for example, that are used to control and move the individually controllable reflective elements 450. In one example, individually controllable reflective elements 450 are tilting, pistoned, or rotating mirrors.

A portion 451 of a light beam (not shown) from a light source (not shown) reflects from pattern generator 430 in different ways depending on whether it reflects from mirrors 450 or inactive areas 448. This is shown as light paths 452 and 454.

It is to be appreciated, an overall light beam will include a plurality of portions 451, each reaching a respective active area 446 and inactive area 448 along a length of pattern generator 430. However, only portions 451 reaching active areas 446 that are turned ON (i.e., when a default for pattering is an ON position), based on pattern information received by pattern generator 430, will form light paths 454, as would be appreciated by one of ordinary skill in the art.

In order to substantially reduce or eliminate light from inactive areas 448 reaching object 410, according to this embodiment of the present invention, a longitudinal axis 458 of pattern generator 430 is angled with respect to a longitudinal axis 464 of object 410 and mirrors 450 are angled away from a normal default position of being parallel to longitudinal axis 458 to being parallel to longitudinal axis 464. For example, mirrors 450 can be rotated or tilted up to about 5° from a normal position. Thus, a reflective surface 466 of mirrors 450 is parallel to longitudinal axis 464 of object 410. Through this configuration, light reflecting from inactive areas 448 along light path 454 is directed away from object 410 and/or light path 452.

Thus, in contrast to conventional systems, in which a longitudinal axis of a pattern generator is not angled with respect to a longitudinal axis of an object, light paths 452 and 454 can overlap at one or more points. Also, light from inactive areas 448 can reach object 410. When either of these situations occur, light from inactive areas 448 can cause errors in the pattern being formed on or displayed by object 410.

In one example, in order to substantially equalize path lengths of light traveling along light paths 452, an optical element 468 is used. In one example, optical element 468 is a wedge shaped optic having a thickness decreasing in a direction corresponding to an increasing path length between mirrors 450 and object 410.

Exemplary Operation

Figure 5:
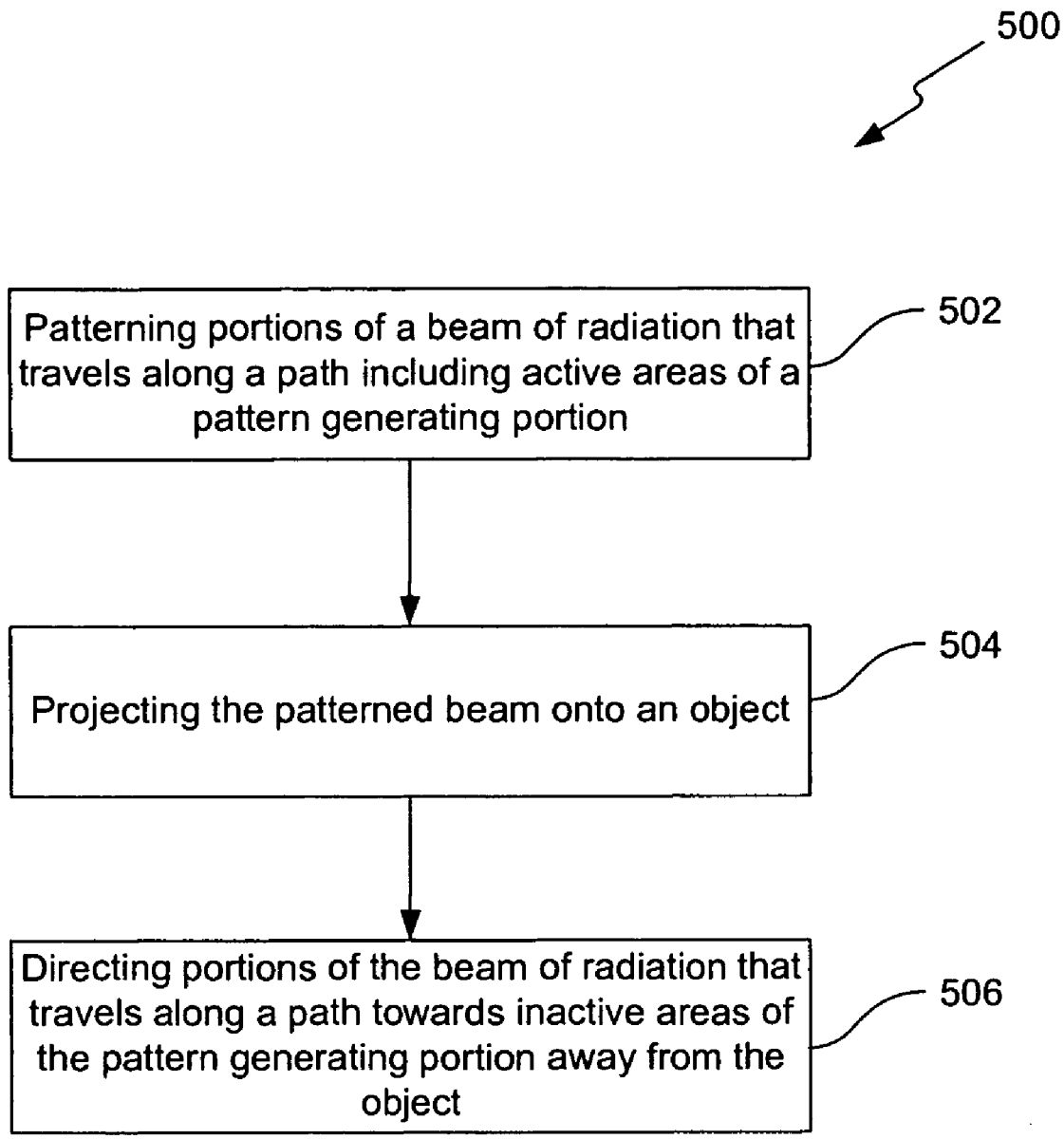
FIG. 5 shows a flowchart depicting a method, according to one embodiment of the present invention.

FIG. 5 is a flowchart depicting a method 500, according to one embodiment of the present invention. In step 502, a beam of radiation is received at a pattern generating portion having active and inactive areas. In step 504, the beam is patterned through interaction with the active areas. In step 506, the patterned beam is directed along a first light path. In step 508, light interacting with the inactive areas is directed away from the first light path along a second light path. In step 510, the patterned beam traveling along the first light path is projected onto an object.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system, comprising:
   a pattern generating portion including individually controllable element areas and circuit areas;
   a projection system, and
   an object,
   wherein the pattern generating portion patterns light traveling towards the individually controllable element areas and the projection system projects the patterned light onto the object,
   wherein the pattern generating portion directs light traveling towards the circuit areas away from the object.

2. The system of claim 1, wherein the pattern generating portion comprises:
   a pattern generator having idividually controllable elements within the idividually controllable element areas; and
   a masking device having transmissive areas corresponding to the individually controllable element areas.

3. The system of claim 2, wherein a longitudinal axis of the masking device is at an angle with respect to a longitudinal axis of the pattern generator.

4. The system of claim 2, wherein the first light path from each of the individually controllable element areas is through a respective one of the transmissive areas.

5. The system of claim 2, wherein:
   the masking device comprises a patterned substrate having patterned and unpatterned areas; and
   the unpatterned areas form the transmissive areas.

6. The system of claim 2, wherein:
   the masking device comprises a glass substrate with a chrome patterned layer having patterned and unpatterned areas; and
   the unpatterned areas form the transmissive areas.

7. The system of claim 2, wherein the pattern generator is a reflective pattern generator.

8. The system of claim 2, wherein the pattern generator is a digital mirror device.

9. The system of claim 2, wherein the pattern generator comprises an array of reflective ones of the individually controllable elements.

10. The system of claim 2, wherein:
    each of the individually controllable element areas comprises a moveable mirror; and
    each of the circuit areas is coupled to a corresponding one of the moveable mirrors.

11. The system of claim 1, wherein the pattern generating portion comprises:
    a pattern generator having an array of reflective individually controllable elements within the individually controllable element areas,
    wherein the pattern generator has a longitudinal axis at an angle with respect to a longitudinal axis of the object, and
    wherein a reflective surface of each controllable element in the array of individually controllable elements is parallel to the longitudinal axis of the object.

12. The system of claim 11, further comprising:
    an optical element having a thickness that increases from a first end to a second end, such that a path length from each element in the array of reflective individually controllable elements to the object is substantially equal.

13. The system of claim 11, wherein the optical element comprises a wedge shaped optical element, wherein a thickest portion of the wedge shaped optical element is positioned proximate an end of the pattern generator closest to the object.

14. The system of claim 11, wherein the pattern generator is a digital mirror device.

15. The system of claim 1, wherein the object comprises a work piece.

16. The system of claim 1, wherein the object comprises a substrate.

17. The system of claim 16, wherein the substrate is one of a semiconductor wafer or a flat panel display glass substrate.

18. The system of claim 1, wherein the object comprises a display device.

19. The system of claim 1, wherein the display device is in a projection display system.

20. A method, comprising:
   patterning portions of a beam of radiation that travels along a path including individually controllable areas of a pattern generating portion;
   projecting the patterned beam onto an object; and
   directing portions of the beam of radiation that travels along a path towards circuit areas of the pattern generating portion away from the object.

21. The method of claim 20, further comprising providing a display device as the object.

22. The method of claim 20, further comprising providing a substrate as the object.

23. The method of claim 20, wherein the directing step comprises reflecting, refracting, scattering, or diffracting light away from the object using a masking device in the pattern generating portion.

24. The method of claim 23, further comprising forming a patterned layer of a first surface of the masking device.

25. The method of claim 24, further comprising using a finish of the patterned layer to control the reflecting, refracting, scattering, or diffracting angles of incidence.

26. The system of claim 5, wherein the patterned areas cause reflection, refraction, diffraction or scattering of the light traveling towards circuit areas outside of an angular range of interest collected by a pupil of the projection system.

27. The system of claim 5, wherein a finish of the pattered areas cause reflection, refraction, diffraction or scattering of the light traveling towards circuit areas outside of a desired angular range of interest captured by a pupil of the projection system.

* * * * *

UNITED STATES PATENT AND TRADEMARK OFFICE
CERTIFICATE OF CORRECTION

PATENT NO. : 7,180,573 B2 Page 1 of 1
APPLICATION NO. : 10/965025
DATED : February 20, 2007
INVENTOR(S) : Lipson et al.

It is certified that error appears in the above-identified patent and that said Letters Patent is hereby corrected as shown below:

Column 6
Line 15 replace "having idividually controllable" with --having individually controllable--.
Line 16 replace "within the idividually controllable" with --within the individually controllable--.

Signed and Sealed this

First Day of May, 2007

JON W. DUDAS
*Director of the United States Patent and Trademark Office*